(12) United States Patent  
Gopalan et al.

(10) Patent No.: US 9,154,348 B2  
(45) Date of Patent: Oct. 6, 2015

(54) SYSTEMS AND METHODS FOR IMPROVING COMMUNICATION SENSITIVITY

(71) Applicant: QUALCOMM Incorporated, San Diego, CA (US)

(72) Inventors: RaviKiran Gopalan, San Diego, CA (US); Le Nguyen Luong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/292,616

(22) Filed: May 30, 2014

(65) Prior Publication Data

US 2015/0124906 A1 May 7, 2015

Related U.S. Application Data

(60) Provisional application No. 61/901,352, filed on Nov. 7, 2013.

(51) Int. Cl.
| | |
|---|---|
| H04B 1/69 | (2011.01) |
| H04B 1/707 | (2011.01) |
| H04B 1/713 | (2011.01) |
| H04L 27/12 | (2006.01) |
| H04L 27/20 | (2006.01) |
| H04L 25/49 | (2006.01) |

(52) U.S. Cl.  
CPC ............ *H04L 27/12* (2013.01); *H04L 25/4908* (2013.01); *H04L 27/20* (2013.01)

(58) Field of Classification Search  
CPC ..... H04L 27/12; H04L 27/20; H04L 25/4908; H04B 1/707; H04B 1/7075; H04B 2201/709709; H04B 2201/70703; H04J 13/10; H04J 13/0022; H04J 13/0048; H04J 13/12; H04J 13/00  
USPC .......... 375/140, 141, 146, 272, 282; 708/250, 708/252, 255; 380/268  
See application file for complete search history.

(56) References Cited

U.S. PATENT DOCUMENTS

| | | | | |
|---|---|---|---|---|
| 5,103,459 | A | * | 4/1992 | Gilhousen et al. ............ 370/206 |
| 5,619,575 | A | * | 4/1997 | Koopman et al. ............... 380/28 |
| 6,980,586 | B1 | * | 12/2005 | Ballinger ....................... 375/150 |
| 8,068,548 | B1 |   | 11/2011 | Chen et al. |
| 8,259,862 | B2 |   | 9/2012 | Peng et al. |

(Continued)

FOREIGN PATENT DOCUMENTS

| | | |
|---|---|---|
| JP | 2013110583 A | 6/2013 |
| WO | 03094359 A1 | 11/2003 |

OTHER PUBLICATIONS

Van Dyke R.E., IEEE P802.15, "IEEE 802.15.2 Clause 6 Physical Layer Models," Wireless Personal Area Networks, IEEE P802.15-01/324r0, Jul. 2001, pp. 1-17.

(Continued)

*Primary Examiner* — Phuong Phu  
(74) *Attorney, Agent, or Firm* — Austin Rapp & Hardman

(57) ABSTRACT

A method for improving communication sensitivity by a wireless communication device is described. The method includes obtaining a string of bits. The method also includes mapping each bit in the string of bits to a pre-allocated bit pattern to create a series of concatenated pre-allocated bit patterns. The method further includes generating a modulated signal based on the series. The method additionally includes transmitting the modulated signal.

28 Claims, 11 Drawing Sheets

(56) References Cited

U.S. PATENT DOCUMENTS

2003/0156659 A1 8/2003 Hanaoka et al.
2008/0008256 A1 1/2008 Matsumoto et al.
2011/0116574 A1 5/2011 Dowling et al.

OTHER PUBLICATIONS

International Search Report and Written Opinion—PCT/US2014/062576—ISA/EPO—Jan. 15, 2015.

Murakami T., et al., "Evaluation of BER in bluetooth wireless systems disturbed by radiated noise from spread spectrum clock systems", IEICE Transactions on Communications, Communications Society, Tokyo, JP, vol. E89B, No. 10, XP001520399, ISSN: 0916-8516, DOI: 10.1093/IETCOM/E89-B.10.2897, Oct. 1, 2006, pp. 2897-2904.

* cited by examiner

SYSTEMS AND METHODS FOR IMPROVING COMMUNICATION SENSITIVITY

RELATED APPLICATIONS

This application is related to and claims priority to U.S. Provisional Patent Application Ser. No. 61/901,352 filed Nov. 7, 2013, for "SCHEME FOR IMPROVING RECEIVER SENSITIVITY."

TECHNICAL FIELD

The present disclosure relates generally to communications. More specifically, the present disclosure relates to systems and methods for improving communication sensitivity.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform new functions and/or that perform functions faster, more efficiently or more reliably are often sought after.

Some electronic devices communicate with other electronic devices. These electronic devices may transmit and/or receive electromagnetic signals. For example, a smartphone may transmit signals to and/or receive signals from another device (e.g., a laptop computer, an electronics console in a vehicle, a wireless headset, etc.). In another example, a wireless headset may transmit signals to and/or receive signals from another device (e.g., a laptop computer, a game console, a smartphone, etc.).

However, particular challenges arise in wireless communications. For example, some wireless devices may have a limited range. This limited range may lead to connectivity problems and unsatisfactory performance in some situations. As can be observed from this discussion, systems and methods that improve wireless communications may be beneficial.

SUMMARY

A method for improving communication sensitivity by a wireless communication device is described. The method includes obtaining a string of bits. The method also includes mapping each bit in the string of bits to a pre-allocated bit pattern to create a series of concatenated pre-allocated bit patterns. The method further includes generating a modulated signal based on the series. The method additionally includes transmitting the modulated signal. A Euclidian distance between a first resulting phase pattern and a second resulting phase pattern may be maximized. Generating the modulated signal may be based on constant-envelope modulation.

Each pre-allocated bit pattern may include one or more repetitions of a master pattern. The master pattern may produce a circularly closed phase pattern. The master pattern may include {−1, 1, 1, 1, −1, −1, −1, 1} for a first bit value. The master pattern may include {1, 1, 1, 1, −1, −1, −1, −1} for a second bit value.

An apparatus for improving communication sensitivity is also described. The apparatus includes a pattern mapper configured to map each bit in a string of bits to a pre-allocated bit pattern to create a series of concatenated pre-allocated bit patterns. The apparatus also includes a modulator configured to generate a modulated signal based on the series. The apparatus further includes a transmitter configured to transmit the modulated signal.

Another apparatus for improving communication sensitivity is also described. The apparatus includes means for mapping each bit in a string of bits to a pre-allocated bit pattern to create a string of concatenated pre-allocated bit patterns. The apparatus also includes means for generating a modulated signal based on the series. The apparatus further includes means for transmitting the modulated signal.

A computer-program product for improving communication sensitivity is also described. The computer-program product includes a non-transitory tangible computer-readable medium with instructions. The instructions include code for causing a wireless communication device to obtain a string of bits. The instructions also include code for causing the wireless communication device to map each bit in the string of bits to a pre-allocated bit pattern to create a series of concatenated pre-allocated bit patterns. The instructions further include code for causing the wireless communication device to generate a modulated signal based on the series. The instructions additionally include code for causing a wireless communication device to transmit the modulated signal.

DETAILED DESCRIPTION

Figure 1:
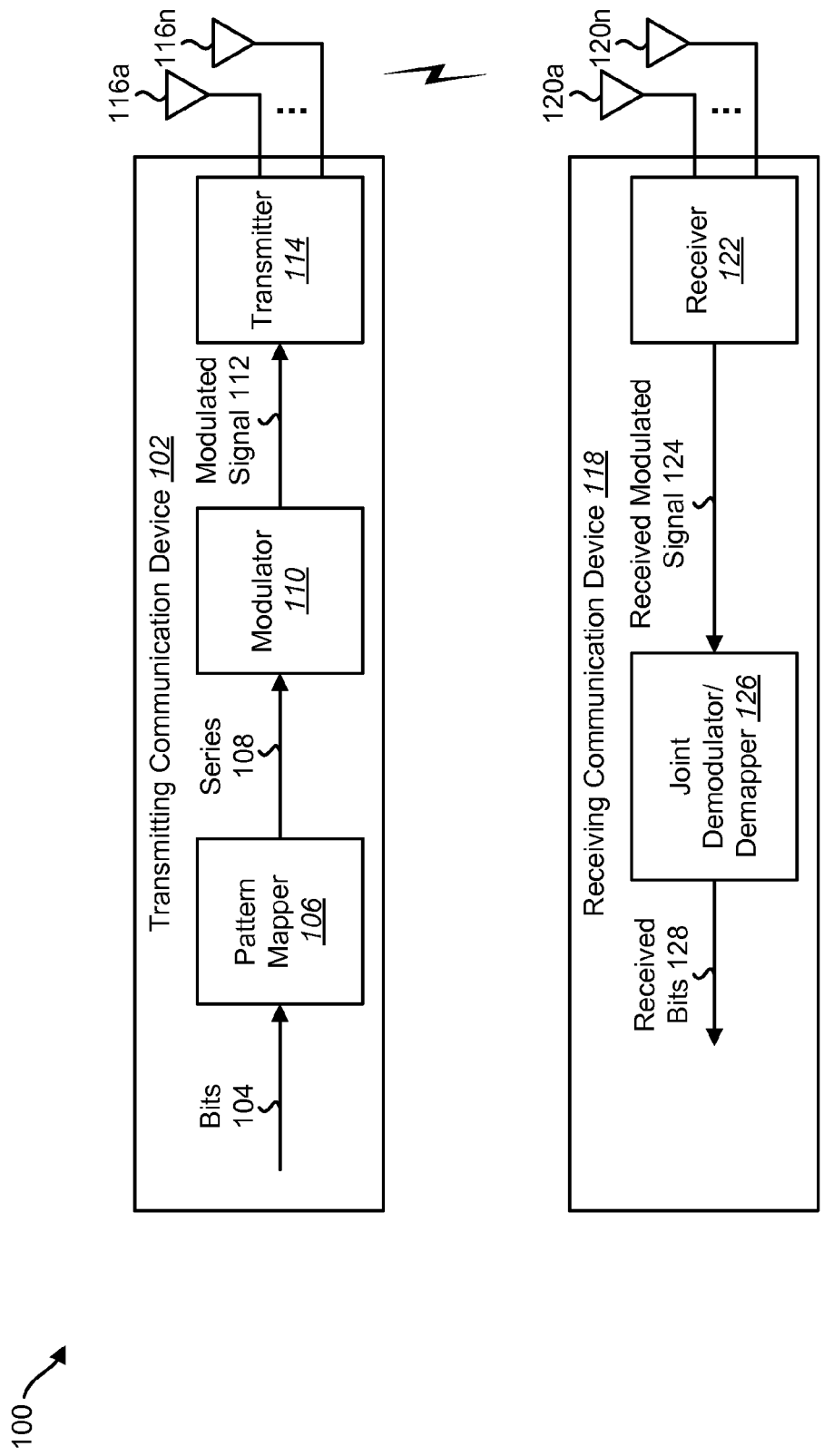
FIG. 1 is a block diagram illustrating one configuration of a transmitting communication device and a receiving communication device in which systems and methods for improving communication sensitivity may be implemented.

The systems and methods disclosed herein may provide transmit (Tx) and/or receive (Rx) schemes for improving wireless communication sensitivity. Improving wireless communication sensitivity may increase the range of some wireless communication systems for various sensor and/or connectivity solutions. For example, the systems and methods disclosed herein provide particular Tx/Rx formats to improve sensitivity.

The systems and methods described herein may be implemented on a variety of different electronic devices. Examples of electronic devices include general purpose or special purpose computing system environments or configurations, personal computers (PCs), server computers, handheld or laptop devices, multiprocessor systems, microprocessor-based systems, programmable consumer electronics, network PCs, minicomputers, mainframe computers, distributed computing environments that include any of the above systems or devices and the like. The systems and methods may also be implemented in mobile devices such as phones, smartphones, wireless headsets, personal digital assistants (PDAs), ultra-mobile personal computers (UMPCs), mobile Internet devices (MIDs), etc. Further, the systems and methods may be implemented by battery-operated devices, sensors, etc. The following description refers to wireless communication devices for clarity and to facilitate explanation. Those of ordinary skill in the art will understand that a wireless communication device may comprise any of the devices described above as well as a multitude of other devices.

The Bluetooth wireless communication standard is typically employed for exchanging communications between fixed or mobile Bluetooth-enabled devices over short distances. In some configurations, the systems and methods disclosed herein may be applied to improve the sensitivity of Bluetooth Low Energy (LE) devices. LE refers to the "Low Energy" extension of the Bluetooth standard. The LE extension is focused on energy-constrained applications such as battery-operated devices, sensor applications, etc. The following description uses terminology associated with the Bluetooth and LE standards. Nevertheless, the concepts are applicable to other technologies and standards that involve modulating and transmitting digital data. Accordingly, while some of the description is provided in terms of Bluetooth standards, the systems and methods disclosed herein may be implemented more generally in wireless communication devices that may not conform to Bluetooth standards.

An LE device may comprise a transmitter, a receiver, or both a transmitter and a receiver. An LE device may also use a frequency-hopping transceiver to combat interference and fading.

Some configurations of the systems and methods disclosed herein may provide Tx and/or Rx schemes for improving LE sensitivity. For example, the systems and methods may be applied to increase the range of Bluetooth or LE Rx systems for various sensor and/or connectivity solutions. For example, the current sensitivity of LE systems may be approximately −99 decibels referenced to 1 milliwatt (dBm). However, a target sensitivity may be approximately −115 dBm. Accordingly, a desired improvement in sensitivity may be approximately 15 decibels (dB). The LE standard defines the receiver sensitivity level as the receiver input level that achieves a 0.1% bit error rate (BER). As explained in further detail below, the systems, methods and apparatuses described herein may improve a receiver sensitivity level by 15 dB.

One benefit of the systems and methods described herein is that they may be applied to (e.g., overlaid atop) any existing LE scheme with only minimal changes required. In some configurations, the systems and methods disclosed herein improve the sensitivity of an LE receiver by implementing a bit-level coding scheme at the transmitter and/or joint demodulation/decoding at the receiver.

LE systems operate in the unlicensed 2.4 gigahertz (GHz) Industrial-Scientific-Medical (ISM) band at 2.400-2.4835 GHz (2400-2483.5 megahertz (MHz)). The operating frequency bands of LE systems are illustrated in Equation (1). In particular, LE systems use forty radio frequency (RF) channels with center frequencies (f) as illustrated in Equation (1).

$$f=2042+k \times 2 \text{ MHz}; k=0,\ldots,39 \qquad (1)$$

Various configurations are described with reference to the Figures, where like reference numbers may indicate functionally similar elements. The systems and methods as generally described and illustrated in the Figures could be arranged and designed in a wide variety of different configurations. Thus, the following more detailed description of several configurations, as represented in the Figures, is not intended to limit scope, but is merely representative.

FIG. 1 is a block diagram illustrating one configuration of a transmitting communication device 102 and a receiving communication device 118 in which systems and methods for improving communication sensitivity may be implemented. The transmitting communication device 102 and the receiving communication device 118 may be included in a wireless communication system 100. Wireless communication systems 100 are widely deployed to provide various types of communication content such as voice, data and so on. The transmitting communication device 102 and the receiving communication device 118 are examples of wireless communication devices.

Although FIG. 1 depicts a transmitting communication device 102 and a receiving communication device 118, a wireless communication device may be capable of both transmitting and receiving. Thus, a single wireless communication device may comprise all of the components depicted in the transmitting communication device 102 and the receiving communication device 118. In addition, a wireless communication device may comprise other components not illustrated in FIG. 1. Those skilled in the art will understand that the wireless communication devices of FIG. 1 have been simplified to facilitate explanation.

Communications in the wireless system may be achieved through transmissions over a wireless link. Such a wireless link may be established via a single-input and single-output (SISO), multiple-input and single-output (MISO) or a multiple-input and multiple-output (MIMO) system. A MIMO system includes transmitter(s) and receiver(s) equipped, respectively, with multiple ($N_T$) transmit antennas and multiple ($N_R$) receive antennas for data transmission. In some configurations, the wireless communication system 100 may utilize MIMO. A MIMO system may support time division duplex (TDD) and/or frequency division duplex (FDD) systems.

In some configurations, the wireless communication system 100 may operate in accordance with one or more standards. Examples of these standards include Bluetooth (e.g., Institute of Electrical and Electronics Engineers (IEEE) 802.15.1), IEEE 802.11 (Wi-Fi), IEEE 802.16 (Worldwide Interoperability for Microwave Access (WiMAX), Global System for Mobile Communications (GSM), Universal Mobile Telecommunications System (UMTS), CDMA2000, Long Term Evolution (LTE), etc. Accordingly, the transmitting communication device 102 may communicate with the receiving communication device 118 using a communication protocol such as LE in some configurations.

In some configurations, the wireless communication system 100 may be a multiple-access system capable of supporting communication with multiple wireless communication devices by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, evolution-data optimized (EV-DO), single-carrier frequency division multiple access (SC-FDMA) systems, General Packet Radio Service (GPRS) access network systems, 3rd Generation Partnership Project (3GPP) Long Term Evolution (LTE) systems, and spatial division multiple access (SDMA) systems.

In LTE and UMTS, a wireless communication device may be referred to as a "user equipment" (UE). In 3GPP Global System for Mobile Communications (GSM), a wireless communication device may be referred to as a "mobile station" (MS). The transmitting communication device 102 and/or the receiving communication device 118 may be referred to as and/or may include some or all of the functionality of a UE, MS, terminal, an access terminal, a subscriber unit, a station, etc. Examples of the transmitting communication device 102 and/or the receiving communication device 118 include cellular phones, smartphones, wireless headsets, wireless speakers, personal digital assistants (PDAs), wireless devices, electronic automobile consoles, gaming systems, wireless controllers, sensors, wireless modems, handheld devices, laptop computers, Session Initiation Protocol (SIP) phones, wireless local loop (WLL) stations, etc.

The transmitting communication device 102 and/or the receiving communication device 118 may include one or more components as illustrated in FIG. 1. For example, the transmitting communication device 102 may comprise a pattern mapper 106, a modulator 110, a transmitter 114 and/or one or more antennas 116a-n. Additionally or alternatively, the receiving communication device 118 may comprise one or more antennas 120a-n, a receiver 122 and/or a joint demodulator/demapper 126. It should be noted that fewer or more components may be included in the transmitting communication device 102 and/or the receiving communication device 118. Each of the one or more components may be implemented in hardware or in a combination of hardware and software. For example, the pattern mapper 106 may be implemented in hardware (e.g., circuitry) or in a combination of hardware and software (e.g., processor with instructions).

Lines and/or arrows in the Figures may indicate a coupling between components. For example, the pattern mapper 106 may be coupled to the modulator 110, which may be coupled to the transmitter 114, which may be coupled to the one or more antennas 116a-n. As used herein, the term "couple" and variations thereof may denote a direct connection or an indirect connection. For example, the pattern mapper 106 may be directly connected to the modulator 110 (without any intervening components) or may be indirectly connected to the modulator 110 (through one or more intervening components).

The transmitting communication device 102 may obtain a string of bits 104. Each of the string of bits 104 may have a binary value (e.g., 1 or 0, on or off, etc.). The string of bits 104 may represent data for transmission. For example, the string of bits 104 may represent payload and/or control information. Examples of the information that may be represented by the string of bits 104 may include voice calls, Internet traffic, text messages, error-detecting code, error-correcting code, retransmissions, power control bits, access requests, etc. The string of bits 104 may originate at the transmitting communication device 102 and/or from a remote device. Obtaining the string of bits 104 may include generating the string of bits 104 and/or receiving the string of bits 104. For example, the transmitting communication device 102 may capture, digitize and/or encode a voice signal to obtain the string of bits 104. In another example, the transmitting communication device 102 may receive text input from a user, which the transmitting communication device 102 may format into the string of bits 104. In yet another example, the transmitting communication device 102 may receive the string of bits 104 from a remote device (via wired or wireless transmission, for example).

The transmitting communication device 102 may provide the string of bits 104 to the pattern mapper 106. The pattern mapper 106 may receive the string of bits 104 that represent data for transmission. The pattern mapper 106 may map each bit in the string of bits 104 to a pre-allocated bit pattern to create a series 108 of concatenated pre-allocated bit patterns. For example, the pattern mapper 106 may create (e.g., generate) a pre-allocated bit pattern for each bit as indicated by each bit (e.g., binary value) in the string of bits 104. Each pre-allocated bit pattern may be a set of bits with a predetermined pattern of binary values. Each pre-allocated bit pattern (e.g., set of bits) may have a predetermined size (e.g., length) or include a predetermined number of bits. Mapping each bit in the string of bits 104 may include selecting a first pre-allocated bit pattern if a bit has a first binary value (e.g., 0) and selecting a second pre-allocated bit pattern if the bit has a second binary value (e.g., 1).

The pattern mapper 106 may concatenate the pre-allocated bit patterns selected for each bit in the string of bits 104 to create the series 108 of concatenated pre-allocated bit patterns. In some configurations, the pre-allocated bit patterns may be concatenated in the same order as the order of corresponding bits in the string of bits 104. Additionally or alternatively, the number of pre-allocated bit patterns (e.g., sets of bits) in the series 108 may be the same as the number of bits in the string of bits 104.

In some configurations, the pattern mapper 106 may map each bit (with a binary value of 0 or 1) in the string of bits 104 to a pre-allocated bit pattern as illustrated in Equation (2).

$$0 \rightarrow \{p_0^0, p_1^0, \ldots p_{N-1}^0\}$$

$$1 \rightarrow \{p_0^1, p_1^1, \ldots, p_{N-1}^1\} \quad (2)$$

In Equation (2), $\{p_0^0, p_1^0, \ldots p_{N-1}^0\}$ is a first pre-allocated bit pattern and $\{p_0^1, p_1^1, \ldots p_{N-1}^1\}$ is a second pre-allocated bit pattern, where N is a size (e.g., length) of the pre-allocated bit patterns, $p_i^0, p_i^1 \in \{1, -1\}$ and $0 \leq I \leq N-1$. In one example, $\{p_0^0, p_1^0, \ldots p_{N-1}^0\} = \{-1, 1, 1, 1, -1, -1, -1, 1\}$ and $p_0^1, p_1^1, \ldots p_7^1 = \{1, 1, 1, 1, -1, -1, -1, -1\}$.

In some configurations, the pattern mapper 106 may perform the mapping with pre-allocated bit patterns of different sizes and/or in accordance with multiple rates. A pattern mapper 106 that is capable of utilizing pre-allocated bit patterns of different sizes and/or in accordance with multiple rates may be referred to as a variable-rate pattern mapper.

In some implementations, the pattern mapper 106 may utilize a set of only two pre-allocated bit patterns per rate. For example, for a first rate, the pattern mapper 106 may only select between two pre-allocated bit patterns for each bit in the string of bits 104 (e.g., a first pre-allocated bit pattern corresponding to a "0" bit and a second pre-allocated bit pattern corresponding to a "1" bit). Within each set of pre-allocated bit patterns, each pre-allocated bit pattern may have the same size (e.g., N). However, different sets of pre-allocated bit patterns may have different sizes. For example, a first set of pre-allocated bit patterns may include two pre-allocated bit patterns, each with size N=8. A second set of pre-allocated bit patterns may include two pre-allocated bit patterns, each with size N=16.

In some configurations, the transmitting communication device 102 (e.g., the pattern mapper 106) may control sensitivity and data rate by the pre-allocated bit pattern size. For example, the size (e.g., N) of the pre-allocated bit pattern may be adjusted to trade off receiver sensitivity with a higher data rate. In particular, selecting the pre-allocated bit pattern size (e.g., N) may trade off communication sensitivity with an effective bit rate $R_{eff}$ as illustrated in Equation (3).

$$R_{eff} = \frac{R_0}{N} \quad (3)$$

In Equation (3), $R_{eff}$ is the effective bit rate, $R_0$ is a base data rate and N is the pre-allocated bit pattern size. In one example, the base data rate of LE $R_{LE}=R_0=1$ megabits per second (Mbps). Accordingly, if a pre-allocated bit pattern size of N=8 is selected, then $R_{eff}=\frac{1}{8}$ Mbps. As can be observed, increasing the pre-allocated bit pattern size N increases sensitivity while lowering the effective bit rate $R_{eff}$. In some configurations, the transmitting communication device 102 may send rate information (e.g., a pre-allocated bit pattern size N) to the receiving communication device 118.

In some configurations, a pre-allocated bit pattern may be formed by repeating a master pattern (MP). A master pattern may be a base pre-allocated bit pattern that may be repeated one or more times to generate a longer pre-allocated bit pattern. For example, a master pattern with N=8 may be repeated one or more times to form a pre-allocated bit pattern with N=8 (one repetition), N=16 (two repetitions), N=24 (three repetitions), N=32 (four repetitions), etc. The multiple repeated master patterns may be concatenated to form the pre-allocated bit pattern. The master pattern may have certain properties. The master pattern may cause no effective change in the phase of the modulated signal 112 (even when repeated multiple times, for example). In particular, the effective change in phase $P_{effchange}=P_{before}-P_{after}$, where $P_{before}$ is the phase of the signal (e.g., modulated signal 112) before the pattern begins and $P_{after}$ is the phase of the signal (e.g., modulated signal 112) after the pattern ends. In other words, the initial phase of the modulated signal 112 (e.g., LE signal) and the phase of the modulated signal 112 after the master pattern will be the same. Since pre-allocated bit patterns of other sizes (e.g., lengths) may be formed by repeating the master pattern, all pre-allocated bit patterns will share the same property.

In some examples, a first master pattern may comprise $MP^0=\{-1, 1, 1, 1, -1, -1, -1, 1\}$ for a first bit value (e.g., 0) and a second master pattern may comprise $MP^1=\{1, 1, 1, 1, -1, -1, -1, -1\}$ for a second bit value (e.g., 1). Based on these master patterns, the transmitting communication device 102 may use the following pre-allocated bit patterns for N=8 as illustrated in Equations (4)-(5), N=16 as illustrated in Equations (6)-(7), N=24 as illustrated in Equations (8)-(9) and N=32 as illustrated in Equations (10)-(11).

$$\{p_0^0, p_1^0, \ldots p_7^0\} = \{-1, 1, 1, 1, -1, -1, -1, 1\} \quad (4)$$

$$\{p_0^1, p_1^1, \ldots, p_7^1\} = \{1, 1, 1, 1, -1, -1, -1, -1\} \quad (5)$$

$$\{p_0^0, p_1^0, \ldots, p_{15}^0\} = \quad (6)$$
$$\{-1, 1, 1, 1, -1, -1, -1, 1, -1, 1, 1, 1, -1, -1, -1, 1\}$$

$$\{p_0^1, p_1^1, \ldots, p_{15}^1\} = \quad (7)$$
$$\{1, 1, 1, 1, -1, -1, -1, -1, 1, 1, 1, 1, -1, -1, -1, -1\}$$

$$\{p_0^0, p_1^0, \ldots, p_{23}^0\} = \{-1, 1, 1, 1, -1, -1, -1, 1, \quad (8)$$
$$-1, 1, 1, 1, -1, -1, -1, 1, -1, 1, 1, 1, -1, -1, -1, 1\}$$

$$\{p_0^1, p_1^1, \ldots, p_{23}^1\} = \{1, 1, 1, 1, -1, -1, -1, -1, 1, \quad (9)$$
$$1, 1, 1, -1, -1, -1, -1, 1, 1, 1, 1, -1, -1, -1, -1\}$$

$$\{p_0^0, p_1^0, \ldots, p_{31}^0\} = \{-1, 1, 1, 1, -1, -1, -1, 1, -1, 1, 1, 1, -1, -1, \quad (10)$$
$$-1, 1, -1, 1, 1, 1, -1, -1, -1, 1, -1, 1, 1, 1, -1, -1, -1, 1\}$$

$$\{p_0^1, p_1^1, \ldots, p_{31}^1\} = \{1, 1, 1, 1, -1, -1, -1, -1, 1, 1, 1, 1, -1, -1, \quad (11)$$
$$-1, -1, 1, 1, 1, 1, -1, -1, -1, -1, 1, 1, 1, 1, -1, -1, -1, -1\}$$

Accordingly, the pattern mapper 106 may map each bit in the string of bits 104 to a pre-allocated bit pattern to create a series 108 of concatenated pre-allocated bit patterns. This mapping may occur before modulation. As can be observed, the mapping may change the bit rate (e.g., throughput). The pattern mapper 106 may concatenate the pre-allocated bit patterns in the same order as the string of binary bits. The series 108 of concatenated pre-allocated bit patterns may be provided to the modulator 110.

The modulator 110 may generate a modulated signal 112 based on the series 108. The modulator may use the series 108 of concatenated pre-allocated bit patterns to generate a series of concatenated phase patterns (e.g., pre-allocated phase patterns). In some configurations, the modulation performed by the modulator 110 may be constant-envelope modulation. In other words, generating the modulated signal 112 may be based on constant-envelope modulation. Constant-envelope modulation (e.g., frequency-shift keying (FSK), Gaussian frequency-shift keying (GFSK), phase-shift keying (PSK), etc.) may be modulation that does not modulate signal amplitude. One particular example of constant-envelope modulation is GFSK modulation. For instance, the modulator 110 may use GFSK modulation to generate the modulated signal 112 from the series 108 of concatenated phase patterns. More detail regarding GFSK modulation is provided in connection with FIG. 6. In some configurations, the modulator 110 may utilize a modulation index of 0.5 (e.g., h=0.5).

A master pattern, when modulated, may produce a circularly closed phase pattern. A circularly closed phase pattern may be a phase pattern where the initial phase (before modulating the pre-allocated bit pattern) and the final phase (after modulating the pre-allocated bit pattern) are the same. If a modulated master pattern produces a circularly closed phase pattern, then a phase pattern generated based on one or more repetitions of the master pattern will also be a circularly closed phase pattern. For example, circularly closed phase may be one benefit of utilizing the master pattern with a modulation index of h=0.5 to produce a transmit pattern.

In some configurations, the master patterns (for binary value 0 and binary value 1) may further be selected to maximize the Euclidian distance between the resulting phase patterns. The Euclidian distance between two phase patterns generated based on the master patterns may be calculated as illustrated in Equation (12).

$$\exp(\Phi(p_0^0, p_1^0, \ldots p_{N-1}^0)) \times \exp(\Phi(p_0^1, p_1^1, \ldots p_{N-1}^1))^* \quad (12)$$

In Equation (12), $\Phi(n)$ is a function that maps each bit (with index n) of the pre-allocated bit pattern to the resulting phase of the modulated signal 112.

In one example, the transmitting communication device 102 may use the following master patterns with N=8 as illustrated in Equation (13).

$$MP^0 = \{p_0^0, p_1^0, \ldots p_7^0\} = \{-1,1,1,1,-1,-1,-1,1\}$$

$$MP^1 = \{p_0^1, p_1^1, \ldots p_7^1\} = \{1,1,1,1,-1,-1,-1,-1\} \quad (13)$$

The modulator 110 may modulate these master patterns with an initial phase of φ and a modulation index of $$h = 0.5 \rightarrow \frac{\pi}{2}.$$

Thus, the resulting phase patterns may be circularly closed phase patterns as illustrated in Equation (14).

$$\{p_0^0, p_1^0, \ldots, p_7^0\} \rightarrow \{\phi - \frac{\pi}{2}, \phi, \phi + \frac{\pi}{2}, \phi + \pi, \phi + \frac{\pi}{2}, \phi, \phi - \frac{\pi}{2}, \phi\} \quad (14)$$

$$\{p_0^1, p_1^1, \ldots, p_7^1\} \rightarrow$$

$$\{\phi + \frac{\pi}{2}, \phi + \pi, \phi + \frac{3\pi}{2}, \phi + 2\pi, \phi + \frac{3\pi}{2}, \phi + \pi, \phi + \frac{\pi}{2}, \phi\}$$

These master patterns may also maximize the Euclidian distance between the resulting phase patterns. For example, the Euclidian distance between the resulting phase patterns may be calculated as illustrated in Equation (15).

$$\exp(\Phi(p_0^0, p_1^0, \ldots, p_7^0)) \times \exp(\Phi(p_0^1, p_1^1, \ldots, p_7^1))^* = \quad (15)$$

$$\exp(\phi - \frac{\pi}{2}, \phi, \phi + \frac{\pi}{2}, \phi + \pi, \phi + \frac{\pi}{2}, \phi, \phi - \frac{\pi}{2}, \phi) \times$$

$$\exp(\phi + \frac{\pi}{2}, \phi + \pi, \phi + \frac{3\pi}{2}, \phi + 2\pi, \phi + \frac{3\pi}{2}, \phi + \pi, \phi + \frac{\pi}{2}, \phi)^* =$$

$$7\exp(-\pi) = 7$$

Accordingly, for N=8, N=16, N=24 and N=32, the Euclidian distance between the resulting phase patterns may be 7, 14, 21 and 28, respectively.

The modulated signal 112 generated by the modulator 110 may be provided to the transmitter 114. In some configurations, the modulated signal 112 may include in-phase (I) and quadrature (Q) components (e.g., component signals). Accordingly, the modulated signal 112 may be an in-phase/quadrature (IQ) waveform in some examples.

The transmitter 114 may transmit the modulated signal 112 to the receiving communication device 118. For example, the transmitter 114 may filter and/or amplify the modulated signal 112, which may be provided to the one or more antennas 116a-n. The one or more antennas 116a-n may radiate the modulated signal 112.

The receiver 122 on the receiving communication device 118 may receive the signal transmitted by the transmitting communication device 102 via one or more antennas 120a-n. The receiver 122 may obtain a received modulated signal 124. For example, the receiver 122 may receive (via one or more antennas 120a-n) amplify and/or filter the signal received from the transmitting communication device 102 to produce the received modulated signal 124. The received modulated signal 124 may include I and Q components (e.g., component signals). Accordingly, the received modulated signal 124 may be an IQ waveform in some examples. The receiver 122 may provide the received modulated signal 124 to the joint demodulator/demapper 126.

The joint demodulator/demapper 126 may receive the received modulated signal 124 (e.g., an IQ waveform). The joint demodulator/demapper 126 may determine a string of received bits 128 based on the received modulated signal 124. For example, the joint demodulator/demapper 126 may determine the string of received bits 128 based on pre-allocated bit patterns and/or based on pre-allocated phase patterns (that correspond to the pre-allocated bit patterns, for example) and based on the received modulated signal 124. For instance, the joint demodulator/demapper 126 may map a series of correlated phase inputs to a series of bits to generate a string of received bits 128.

In some configurations, the joint demodulator/demapper 126 may perform one or more of the following procedures in order to determine the string of received bits 128. The joint demodulator/demapper 126 may convert the received modulated signal 124 (e.g., an IQ waveform) to a phase input. The joint demodulator/demapper 126 may then correlate the phase input with pre-allocated phase patterns (corresponding to pre-allocated bit patterns for binary 1 and binary 0, for example). This may be referred to as hypothesis testing. For example, the joint demodulator/demapper 126 may compare the phase input to a first pre-allocated phase pattern for binary 0 (corresponding to a first pre-allocated bit pattern, for example) and to a second pre-allocated phase pattern for binary 1 (corresponding to a second pre-allocated bit pattern, for example). In some configurations, performing this correlation may be based on rate information (e.g., a pre-allocated bit pattern size N). For example, the joint demodulator/demapper 126 may utilize pre-allocated phase patterns corresponding to the pre-allocated bit patterns with pattern size N.

The joint demodulator/demapper 126 may compare the correlations to determine a string of received bits 128. For example, the joint demodulator/demapper 126 may generate a bit with a value of 0 if the first pre-allocated phase pattern for binary 0 (corresponding to the first pre-allocated bit pattern, for example) has a higher correlation than the second pre-allocated phase pattern for binary 1 (corresponding to the second pre-allocated bit pattern, for example). Conversely, the joint demodulator/demapper 126 may generate a bit with a value of 1 if the second pre-allocated phase pattern for binary 1 (corresponding to the second pre-allocated bit pattern, for example) has a higher correlation than the first pre-allocated phase pattern for binary 0 (corresponding to the first pre-allocated bit pattern, for example). Thus, by correlating the entire phase input with the pre-allocated phase patterns for binary 1 and binary 0, the joint demodulator/demapper may generate a string of received bits 128 (e.g., binary bits). This string of received bits 128 may approximately match the string of bits 104 on the transmitting communication device 102.

In some configurations, the joint demodulator/demapper 126 may be modular because the pre-allocated phase patterns may be generated based on repetitions (e.g., integer multiples) of master patterns. In other words, a joint demodulator/demapper 126 for a phase pattern generated from a master pattern may form the basis for a joint demodulator/demapper 126 for any pre-allocated phase pattern of size (e.g., length) N (corresponding to a pre-allocated bit pattern of size N, for example).

Figure 2:
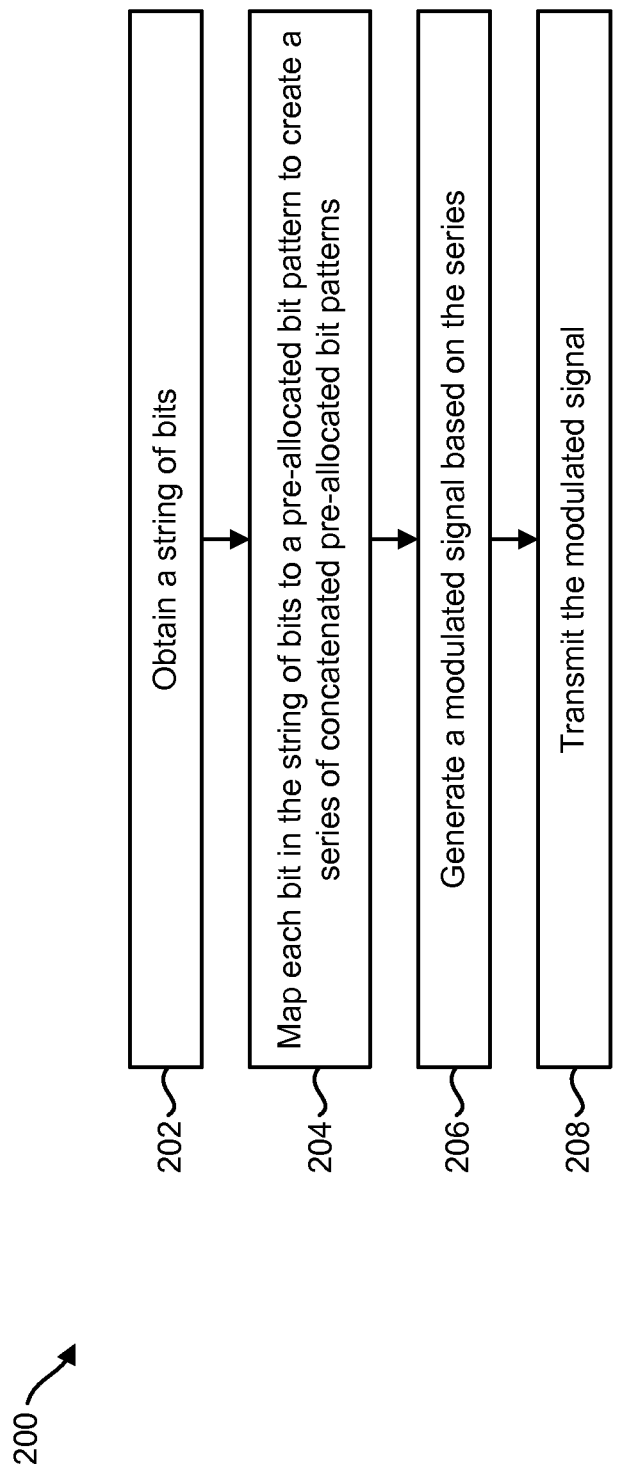
FIG. 2 is a flow diagram illustrating one configuration of a method for improving communication sensitivity.

FIG. 2 is a flow diagram illustrating one configuration of a method 200 for improving communication sensitivity. The method 200 may be performed by a transmitting communication device 102. The transmitting communication device 102 may obtain 202 a string of bits 104. This may be performed as described above in connection with FIG. 1. For example, the transmitting communication device 102 may generate the string of bits 104 and/or may receive the string of bits 104.

The transmitting communication device 102 may map 204 each bit in the string of bits 104 to a pre-allocated bit pattern to create a series 108 of concatenated pre-allocated bit patterns. This may be performed as described above in connection with FIG. 1. For example, the transmitting communication device 102 may select a first pre-allocated bit pattern if a bit (in the string of bits 104) has a first binary value (e.g., 0) and may select a second pre-allocated bit pattern if the bit has a second binary value (e.g., 1). The mapping 204 may be performed as illustrated in Equation (2). Examples of pre-allocated bit patterns are given above in Equations (4)-(11). In some configurations, the pre-allocated bit pattern may be based on one or more repetitions of a master pattern as described above. Additionally or alternatively, the pre-allocated bit pattern may enable circularly closed phase patterns. As described above in connection with FIG. 1, the transmitting communication device 102 may concatenate the pre-allocated bit patterns selected for each bit in the string of bits 104 to create the series 108 of concatenated pre-allocated bit patterns. In some configurations, the transmitting communication device 102 may send rate information (e.g., a pre-allocated bit pattern size N) to the receiving communication device 118.

The transmitting communication device 102 may generate 206 a modulated signal 112 based on the series 108. This may be performed as described above in connection with FIG. 1. For example, the transmitting communication device 102 may modulate the series 108 using constant envelope modulation (e.g., GFSK modulation). In some configurations, a modulation index of h=0.5 may be utilized.

The transmitting communication device 102 may transmit 208 the modulated signal 112. This may be performed as described above in connection with FIG. 1. For example, the transmitting communication device 102 may filter, amplify and/or radiate the modulated signal 112 using one or more antennas 116*a-n*.

Figure 3:
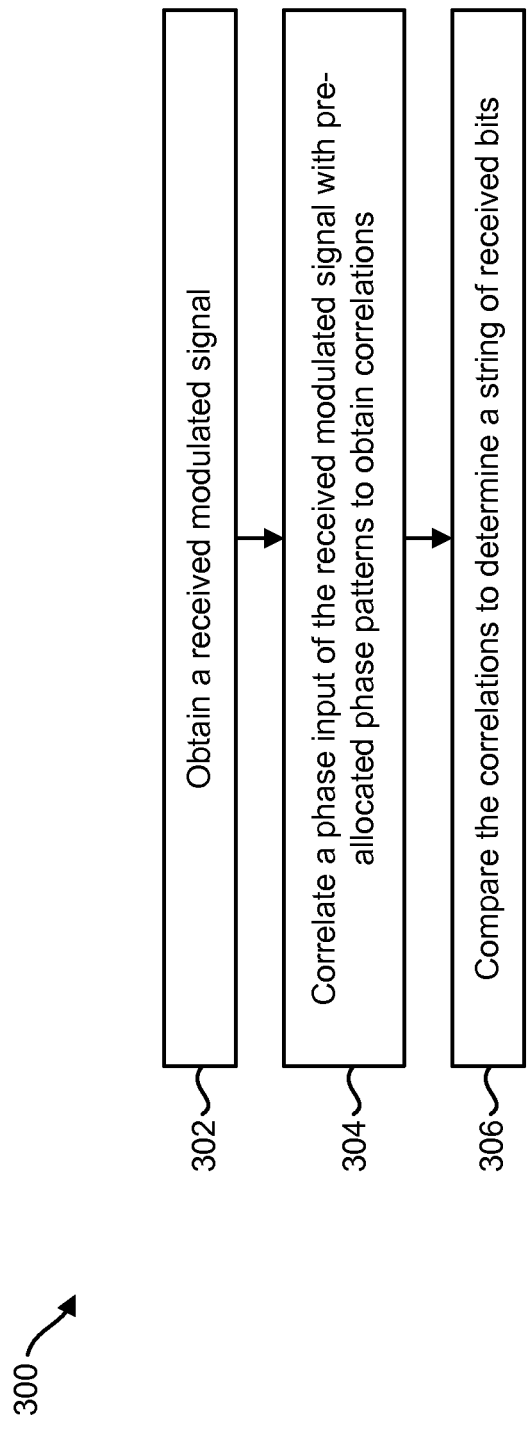
FIG. 3 is a flow diagram illustrating another method for improving communication sensitivity.

FIG. 3 is a flow diagram illustrating another method 300 for improving communication sensitivity. The method 300 may be performed by a receiving communication device 118. The receiving communication device 118 may obtain 302 a received modulated signal 124. This may be accomplished as described above in connection with FIG. 1. For example, the receiving communication device 118 may receive (via one or more antennas 120*a-n*), amplify and/or filter a signal to produce the received modulated signal 124. In some configurations, the receiving communication device 118 may obtain rate information as described above in connection with FIG. 1.

The receiving communication device 118 may correlate 304 a phase input of the received modulated signal 124 with pre-allocated phase patterns. This may be accomplished as described above in connection with FIG. 1. For example, the receiving communication device 118 may compare the phase input to a first pre-allocated phase pattern for binary 0 and to a second pre-allocated phase pattern for binary 1. Correlating the phase input with the first pre-allocated phase pattern may produce a first correlation. Additionally, correlating the phase input with the second pre-allocated phase pattern may produce a second correlation. In some configurations, performing this correlation 304 may be based on rate information (e.g., a pre-allocated bit pattern size N). For example, the receiving communication device 118 may utilize pre-allocated phase patterns corresponding to the pre-allocated bit patterns with pattern size N.

The receiving communication device 118 may compare 306 the correlations to determine a string of received bits 128. This may be performed as described above in connection with FIG. 1. For example, the receiving communication device 118 may generate a bit with a value of 0 if the first pre-allocated phase pattern for binary 0 has a higher correlation with the phase input than the second pre-allocated phase pattern for binary 1. Conversely, the receiving communication device 118 may generate a bit with a value of 1 if the second pre-allocated phase pattern for binary 1 has a higher correlation with the phase input than the first pre-allocated phase pattern for binary 0.

Figure 4:
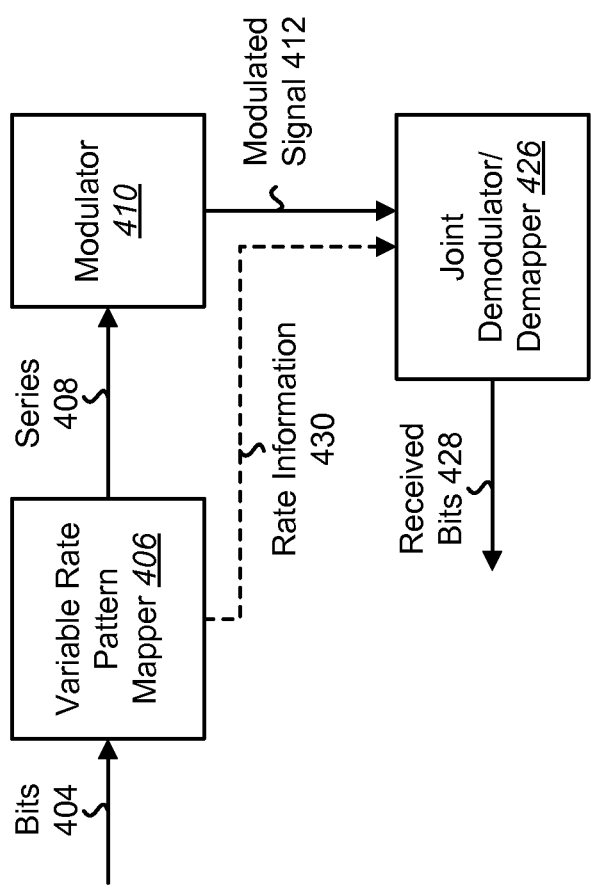
FIG. 4 is a block diagram illustrating one example of components that may be implemented for improving communication sensitivity.

FIG. 4 is a block diagram illustrating one example of components that may be implemented for improving communication sensitivity. In particular, FIG. 4 illustrates a variable rate pattern mapper 406, a modulator 410 and a joint demodulator/demapper 426. The variable rate pattern mapper 406 may be an example of the pattern mapper 106 described in connection with FIG. 1. The modulator 410 may be an example of the modulator 110 described in connection with FIG. 1. The joint demodulator/demapper 426 may be an example of the joint demodulator/demapper 126 described in connection with FIG. 1. In some configurations, the variable rate pattern mapper 406, the modulator 410 and/or the joint demodulator/demapper 426 may be implemented in an LE system (e.g., in one or more LE devices).

A string of bits 404 (e.g., Tx data) comprising binary data (e.g., 0 or 1) may be provided to a variable-rate pattern mapper 406 at a rate of R bits per second (bps). Generally, the variable rate pattern mapper 406 maps each bit of the string of bits 404 (e.g., Tx data) to a unique pre-allocated bit pattern. This may be performed as described above in connection with one or more of FIGS. 1-2. For example, the variable-rate pattern mapper 406 may map each bit of the string of bits 404 to a pre-allocated bit pattern of length N to create a series 408 of concatenated pre-allocated bit patterns. Mapping the string of bits 404 to the series 408 may change the bit rate (of Tx data, for example). In particular, the series 408 of concatenated pre-allocated bit patterns may have a bit rate of NR bps. As described above, a pre-allocated bit pattern may be generated from one or more repetitions of a master pattern. The modulator 410 (e.g., LE modulator) may receive the series 408 of concatenated pre-allocated bit patterns and create a series of concatenated phase patterns (e.g., pre-allocated phase patterns).

Based on the series 408, the modulator 410 may generate a modulated signal 412. As described above, the modulated signal 412 may be an IQ waveform. The modulator 410 may send the IQ waveform to the joint demodulator/demapper 426.

In some configurations, the variable rate pattern mapper 406 may provide rate information 430 to the joint demodulator/demapper 426. For example, the variable rate pattern mapper 406 may specify the size (e.g., N) of the pre-allocated bit pattern. In some configurations, the rate information 430 may be included in the string of bits 404 (as control information, for example). Alternatively, the rate information 430 may be sent as side information and may not be included in the string of bits 404. In other configurations, the receiving communication device (e.g., the joint demodulator/demapper 426) may determine the rate information 430 implicitly. For example, the receiving communication device may examine the modulated signal 412 to determine the rate information 430.

The joint demodulator/demapper 426 may utilize the rate information (e.g., N) to convert the modulated signal 412 (e.g., IQ waveform) to a phase input. The joint demodulator/ demapper 426 may also correlate the phase input with pre-allocated phase patterns to generate received bits 428 (e.g., Rx data) comprising binary data (information) at a rate of R bits per second.

Figure 5:
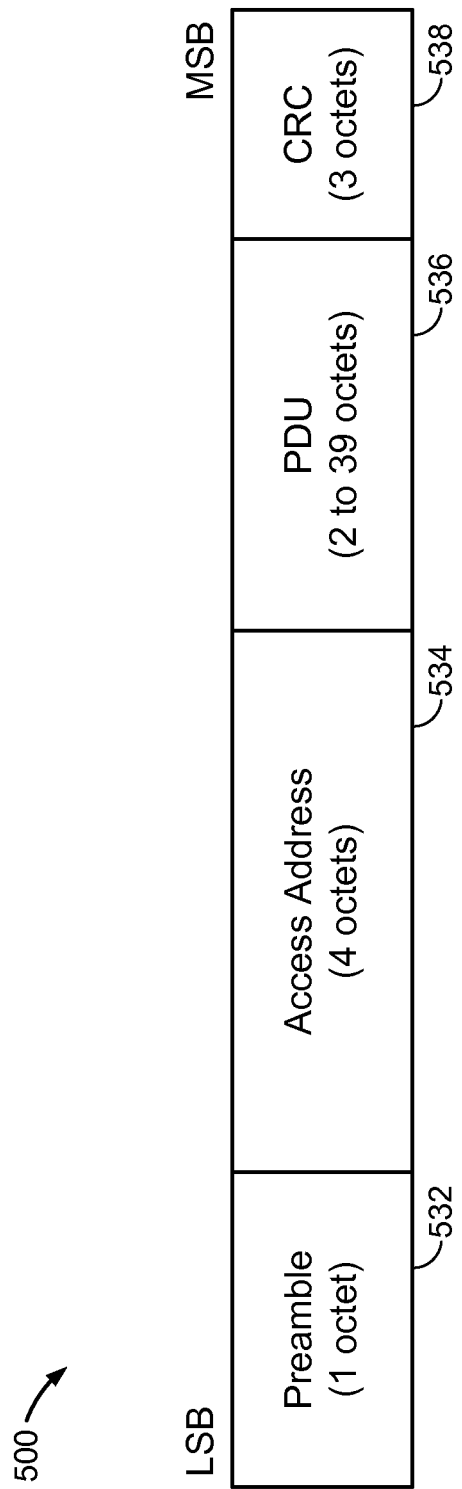
FIG. 5 is a diagram illustrating one example of Bluetooth Low Energy (LE) packet format.

FIG. 5 is a diagram illustrating one example of Bluetooth Low Energy (LE) packet format 500. As described above, some configurations of the systems and methods disclosed herein may be implemented in the context of LE. For example, the string of bits 104 described in connection with FIG. 1 may be arranged in accordance with the packet format 500 described in connection with FIG. 5.

An LE packet comprises four fields as illustrated in FIG. 5. The packet includes a preamble 532, an access address 534, a protocol data unit (PDU) 536 and a cyclic redundancy check (CRC) 538. The preamble 532 begins at the least-significant bit (LSB) and has a length of one octet. The access address 534 follows the preamble 532 and is four octets in length. The PDU 536 follows the access address 534 and is from two to thirty-nine octets in length. The CRC 538 follows the PDU 536. The CRC 538 is three octets in length and terminates at the most-significant bit (MSB).

Figure 6:
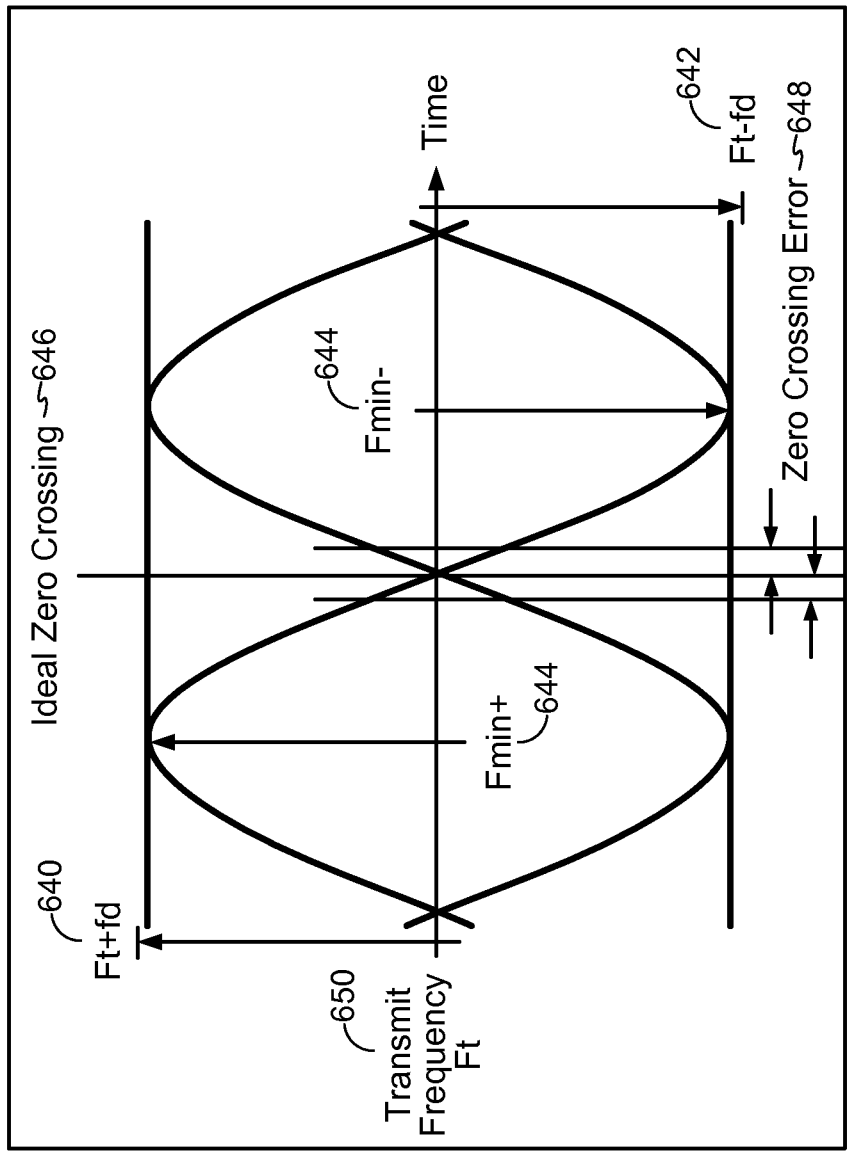
FIG. 6 is a graph illustrating Gaussian Frequency-Shift Keying (GFSK) modulation.

FIG. 6 is a graph illustrating Gaussian Frequency-Shift Keying (GFSK) modulation. As described above, a transmitting communication device 102 (e.g., a modulator 110) may utilize GFSK modulation in some configurations. For example, LE systems use Gaussian Frequency-Shift Keying (GFSK) modulation with a bandwidth bit period product BT=0.5 (where B is bandwidth and T is a bit period). The modulation index is between 0.45 and 0.55. In some configurations, a positive frequency deviation represents binary one and a negative frequency deviation represents binary zero.

Some GFSK parameters are provided in connection with FIG. 6. In particular, the graph illustrated in FIG. 6 includes a horizontal axis over time (e.g., seconds) and a vertical axis over frequency (e.g., hertz (Hz)). As illustrated in FIG. 6, the waveform may be centered at a transmit frequency Ft 650. A deviation frequency fd is as defined. As described above, a deviation in frequency may indicate a binary 0 or a binary 1. For example, a positive frequency deviation to Ft+fd 640 may represent a binary 1, whereas a negative frequency deviation to Ft−fd 642 may represent a binary 0. A point at which the waveform meets Ft+fd 640 is denoted Fmin+ 644 and a point at which the waveform meets Ft−fd 642 is denoted Fmin− 646. A time for an ideal zero crossing 646 is also defined, with a range of time defined for zero crossing error 648.

Figure 7:
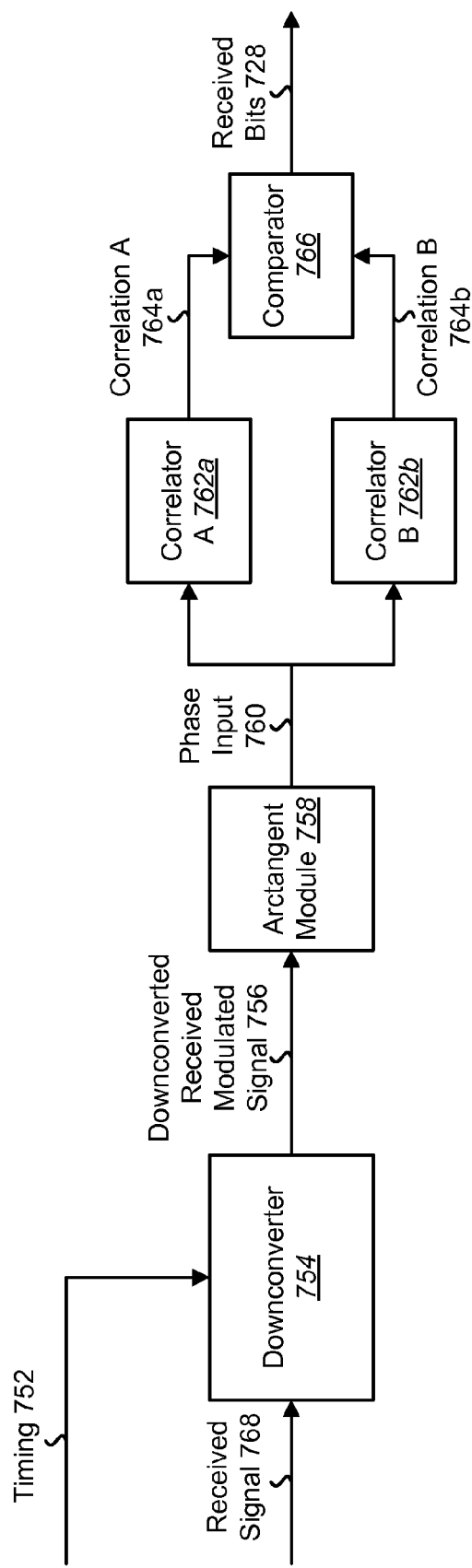
FIG. 7 is a block diagram illustrating one example of components that may be included in a receiving communication device.

FIG. 7 is a block diagram illustrating one example of components that may be included in a receiving communication device. In particular, FIG. 7 illustrates a downconverter 754, an arctangent module 758, correlators 762a-b and a comparator 766. One or more of these illustrated components may be included in the receiving communication device 118 described in connection with FIG. 1 in some configurations. For example, one or more of the illustrated components may be included in the receiver 122, in the joint demodulator/demapper 126 or both in some configurations. One or more of the functions or procedures described in connection with FIG. 7 may be performed as part of joint demodulation and demapping. As described above, for example, the joint demodulator/demapper 126 may take LE modulated IQ values as input and may perform a joint demodulation/decoding operation to convert the IQ values to received data. For instance, the joint demodulator/demapper 126 may perform hypothesis testing (based on pre-allocated phase patterns and/or pre-allocated bit patterns, for example) to determine a string of received bits (e.g., a string of binary data including is and/or 0s).

The downconverter 754 and the arctangent module 758 may be referred to as a first stage. The first stage may convert the received signal 768 (e.g., IQ input) to a phase input 760. One or more of the downconverter 754 and the arctangent module 758 may be included within or separate from the receiver 122 and/or the joint demodulator/demapper 126. For example, the downconverter 754 may be included in the receiver 122 in some configurations. In other configurations, the downconverter 754 and the arctangent module 758 may be included in the joint demodulator/demapper 126.

The downconverter 754 may obtain a received signal 768. The received signal 768 may be an IQ waveform. For example, the received signal 768 may be an IQ waveform at 32 MHz. The downconverter 754 may downconvert the received signal 768 to a downconverted received modulated signal 756. For example, the downconverter 754 may utilize timing 752 obtained from acquisition procedures performed by the receiver 122. The downconverted received modulated signal 756 may be an IQ waveform at a lower frequency than the received signal 768. For example, the downconverted received modulated signal 756 may have a frequency of 1 MHz. The downconverted received modulated signal 756 may be provided to the arctangent module 758.

The arctangent module 758 may convert the downconverted received modulated signal 756 to a phase input. For example, the arctangent module 758 may perform an arctangent operation on the downconverted received modulated signal 756 (e.g., an IQ waveform), resulting in the phase input 760. The phase input 760 may have a frequency of 1 MHz, for example.

The correlators 762a-b and the comparator 766 may be referred to as a second stage. For example, the joint demodulator/demapper 126 may correlate the phase input 760 with pre-allocated phase patterns (corresponding to pre-allocated bit patterns, for instance).

In some configurations, the phase input 760 from the first stage may be input into correlator A 762a and correlator B 762b. Correlator A 762a may correlate the phase input 760 with the pre-allocated phase pattern for binary 0 to produce correlation A 764a. Correlator B 762b may correlate the phase input 760 with the pre-allocated phase pattern for binary 1 to produce correlation B 764b. In some configurations, performing this correlation may be based on rate information (e.g., a pre-allocated bit pattern size N). For example, the receiving communication device 118 may utilize pre-allocated phase patterns corresponding to the pre-allocated bit patterns with pattern size N. The correlations 762a-b may be provided to the comparator 766.

The comparator 766 may compare correlation A 764a to correlation B 764b. For example, the comparator 766 may determine whether correlation A 764a is greater than correlation B 764b. If correlation A 764a is greater than correlation B 764b, the comparator 766 may output a binary 0 as the received bit 728. Otherwise, the comparator 766 may output a binary 1 as the received bit 728. Accordingly, the components described in connection with FIG. 7 may produce a string of received bits 728.

Figure 8:
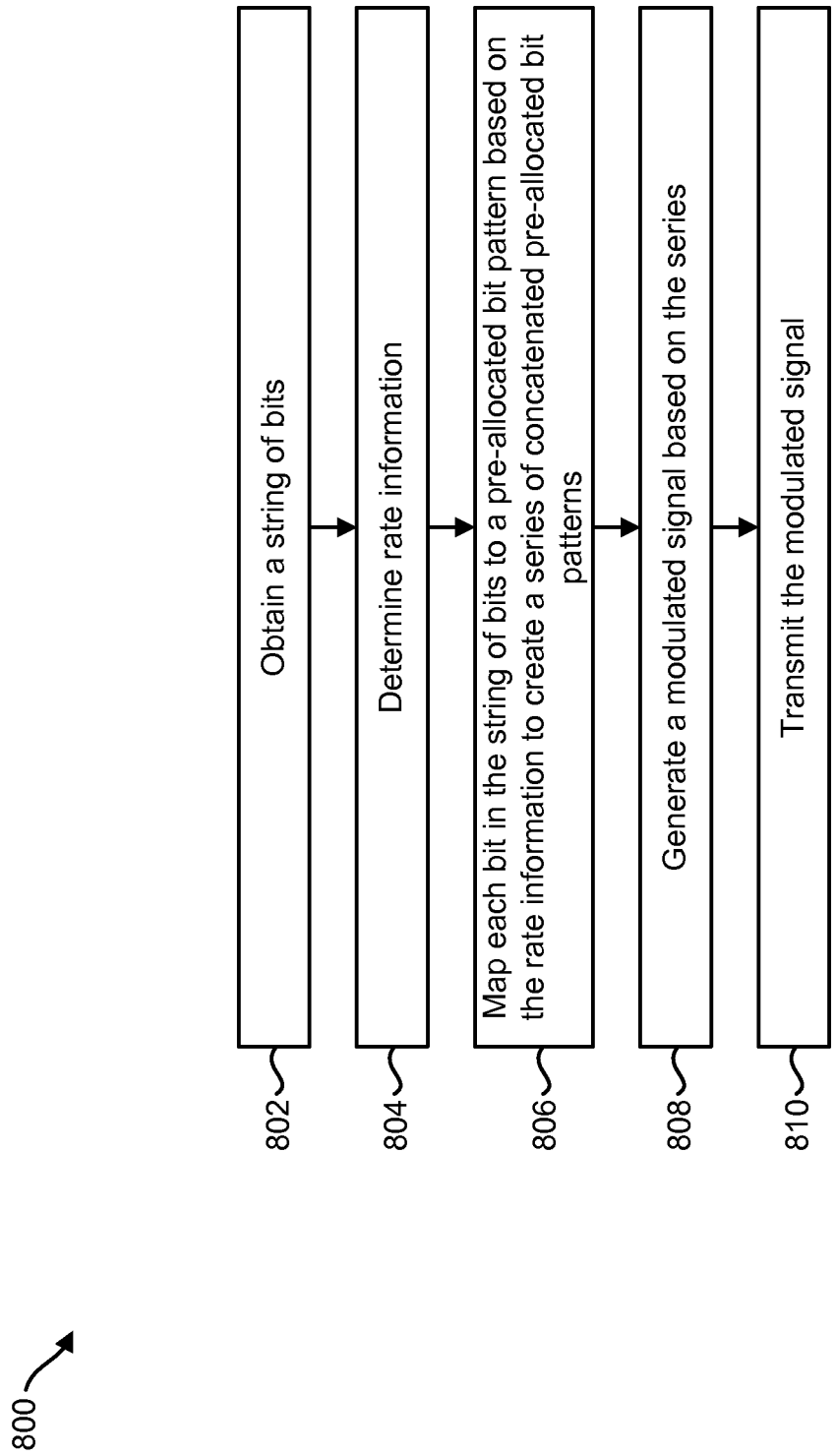
FIG. 8 is a flow diagram illustrating a more specific configuration of a method for improving communication sensitivity.

FIG. 8 is a flow diagram illustrating a more specific configuration of a method 800 for improving communication sensitivity. The method 800 may be performed by a transmitting communication device 102. The transmitting communication device 102 may obtain 802 a string of bits 104. This may be performed as described above in connection with one or more of FIGS. 1-2 and 4-5.

The transmitting communication device 102 may determine 804 rate information. For example, the transmitting communication device 102 may determine a pre-allocated bit pattern size N. In some configurations, determining 804 rate information may include detecting channel quality. For example, the transmitting communication device 102 may receive channel quality information from the receiving communication device 118. For instance, the transmitting communication device 102 may observe signal strength, signal-to-noise ratio (SNR), bit error rate (BER) and/or a number of requested retransmissions or some other metric based on signaling from the receiving communication device 118. If the channel quality (e.g., one or more metrics) is outside of a threshold range, the transmitting communication device 102 may increase or decrease the rate by adjusting the pre-allocated bit pattern size N. For example, if observed BER goes above a threshold, the transmitting communication device 102 may increase the pre-allocated bit pattern size N to increase sensitivity (and accordingly may lower the effective bit rate, for example). Additionally or alternatively, if the observed BER goes below a threshold, the transmitting communication device 102 may decrease the pre-allocated bit pattern size N to decrease sensitivity (and accordingly may increase the effective bit rate, for example).

In some configurations, the transmitting communication device 102 may additionally send rate information (e.g., the pre-allocated bit pattern size N) to the receiving communication device 118. For example, the transmitting communication device 102 may send an indicator specifying a pre-allocated bit pattern size N. For instance, the transmitting communication device may allocate two bits, where 00 indicates N=8, 01 indicates N=16, 10 indicates N=24 and 11 indicates N=32. Other explicit or implicit schemes may be utilized.

The transmitting communication device 102 may map 806 each bit in the string of bits 104 to a pre-allocated bit pattern based on the rate information to create a series 108 of concatenated pre-allocated bit patterns. This may be performed as described above in connection with one or more of FIGS. 1-2 and 4. For example, the transmitting communication device 102 may utilize the pre-allocated bit patterns in Equations (4)-(5) for N=8, in Equations (6)-(7) for N=16, in Equations (8)-(9) for N=24 and in Equations (10)-(11) for N=32.

The transmitting communication device 102 may generate 808 a modulated signal 112 based on the series 108. This may be performed as described above in connection with one or more of FIGS. 1-2, 4 and 6.

The transmitting communication device 102 may transmit 810 the modulated signal 112. This may be performed as described above in connection with one or more of FIGS. 1-2.

Figure 9:
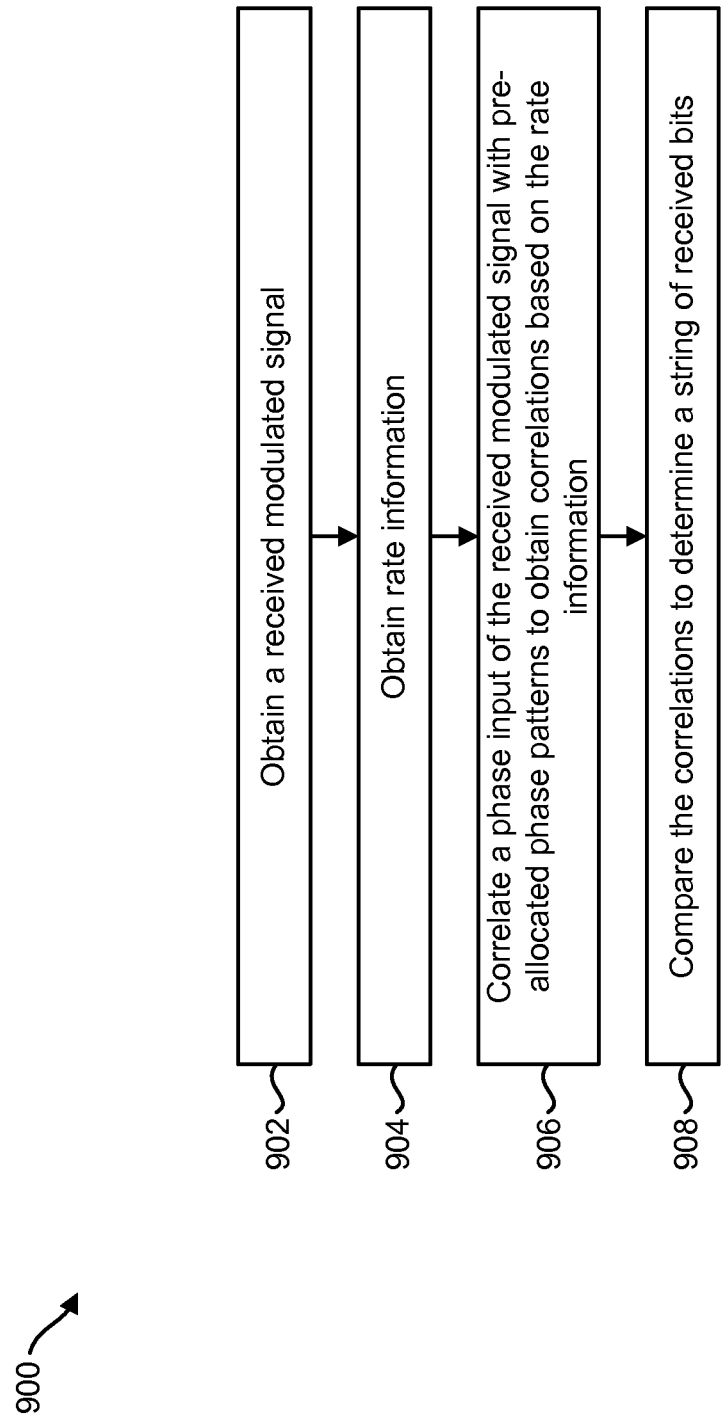
FIG. 9 is a flow diagram illustrating another more specific method for improving communication sensitivity.

FIG. 9 is a flow diagram illustrating another more specific method 900 for improving communication sensitivity. The method 900 may be performed by a receiving communication device 118. The receiving communication device 118 may obtain 902 a received modulated signal 124. This may be accomplished as described above in connection with one or more of FIGS. 1, 3-4 and 7.

The receiving communication device 118 may obtain 904 rate information. This may be accomplished as described above in connection with one or more of FIGS. 1, 3-4 and 7. For example, the rate information may be received in information sent from the transmitting communication device 102 (as control information, for example). Alternatively, the rate information may be received as side information. In other configurations, the receiving communication device 118 may determine the rate information implicitly. For example, the receiving communication device may examine the received modulated signal (e.g., properties of the received modulated signal) to determine the rate information.

The receiving communication device 118 may correlate 906 a phase input of the received modulated signal 124 with pre-allocated phase patterns based on the rate information. This may be accomplished as described above in connection with one or more of FIGS. 1, 3-4 and 7. For example, the receiving communication device 118 may utilize pre-allocated phase patterns corresponding to the pre-allocated bit patterns with pattern size N for the correlation 906.

The receiving communication device 118 may compare 908 the correlations to determine a string of received bits 128. This may be performed as described above in connection with one or more of FIGS. 1, 3-4 and 7.

Figure 10:
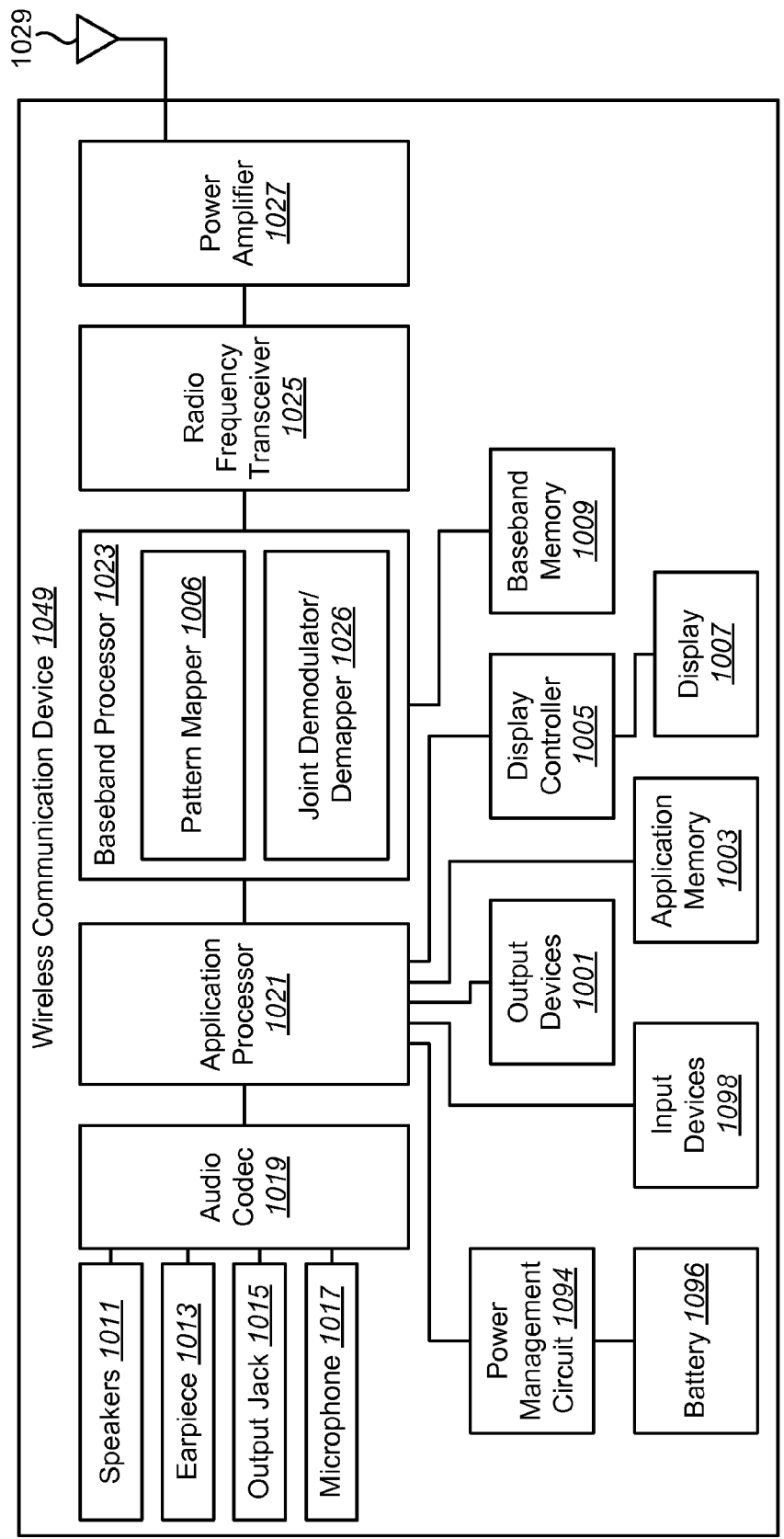
FIG. 10 is a block diagram illustrating another more specific configuration of a wireless communication device in which systems and methods for improving communication sensitivity may be implemented.

FIG. 10 is a block diagram illustrating another more specific configuration of a wireless communication device 1049 in which systems and methods for improving communication sensitivity may be implemented. The wireless communication device 1049 illustrated in FIG. 10 may be an example of one or more of the transmitting communication device 102 and the receiving communication device 118 described in connection with one or more of FIGS. 1-4 and 7-9. The wireless communication device 1049 may include an application processor 1021. The application processor 1021 generally processes instructions (e.g., runs programs) to perform functions on the wireless communication device 1049. The application processor 1021 may be coupled to an audio coder/decoder (codec) 1019.

The audio codec 1019 may be used for coding and/or decoding audio signals. The audio codec 1019 may be coupled to at least one speaker 1011, an earpiece 1013, an output jack 1015 and/or at least one microphone 1017. The speakers 1011 may include one or more electro-acoustic transducers that convert electrical or electronic signals into acoustic signals. For example, the speakers 1011 may be used to play music or output a speakerphone conversation, etc. The earpiece 1013 may be another speaker or electro-acoustic transducer that can be used to output acoustic signals (e.g., speech signals) to a user. For example, the earpiece 1013 may be used such that only a user may reliably hear the acoustic signal. The output jack 1015 may be used for coupling other devices to the wireless communication device 1049 for outputting audio, such as headphones. The speakers 1011, earpiece 1013 and/or output jack 1015 may generally be used for outputting an audio signal from the audio codec 1019. The at least one microphone 1017 may be an acousto-electric transducer that converts an acoustic signal (such as a user's voice) into electrical or electronic signals that are provided to the audio codec 1019.

The application processor 1021 may also be coupled to a power management circuit 1094. One example of a power management circuit 1094 is a power management integrated circuit (PMIC), which may be used to manage the electrical power consumption of the wireless communication device 1049. The power management circuit 1094 may be coupled to a battery 1096. The battery 1096 may generally provide electrical power to the wireless communication device 1049. For example, the battery 1096 and/or the power management circuit 1094 may be coupled to at least one of the elements included in the wireless communication device 1049.

The application processor 1021 may be coupled to at least one input device 1098 for receiving input. Examples of input devices 1098 include infrared sensors, image sensors, accelerometers, touch sensors, keypads, etc. The input devices 1098 may allow user interaction with the wireless communication device 1049. The application processor 1021 may also be coupled to one or more output devices 1001. Examples of output devices 1001 include printers, projectors, screens, haptic devices, etc. The output devices 1001 may allow the wireless communication device 1049 to produce output that may be experienced by a user.

The application processor 1021 may be coupled to application memory 1003. The application memory 1003 may be any electronic device that is capable of storing electronic information. Examples of application memory 1003 include double data rate synchronous dynamic random access memory (DDR SDRAM), synchronous dynamic random access memory (SDRAM), flash memory, etc. The application memory 1003 may provide storage for the application processor 1021. For instance, the application memory 1003 may store data and/or instructions for the functioning of programs that are run on the application processor 1021.

The application processor 1021 may be coupled to a display controller 1005, which in turn may be coupled to a display 1007. The display controller 1005 may be a hardware block that is used to generate images on the display 1007. For example, the display controller 1005 may translate instructions and/or data from the application processor 1021 into images that can be presented on the display 1007. Examples of the display 1007 include liquid crystal display (LCD) panels, light emitting diode (LED) panels, cathode ray tube (CRT) displays, plasma displays, etc.

The application processor 1021 may be coupled to a baseband processor 1023. The baseband processor 1023 generally processes communication signals. For example, the baseband processor 1023 may demodulate and/or decode received signals. Additionally or alternatively, the baseband processor 1023 may encode and/or modulate signals in preparation for transmission.

The baseband processor 1023 may include a pattern mapper 1006 and/or a joint demodulator/demapper 1026. The pattern mapper 1006 may be an example of one or more of the pattern mappers 106, 406 described above. Additionally or alternatively, the joint demodulator/demapper 1026 may be an example of one or more of the joint demodulators/demappers 126, 426 described above.

The baseband processor 1023 may be coupled to baseband memory 1009. The baseband memory 1009 may be any electronic device capable of storing electronic information, such as SDRAM, DDRAM, flash memory, etc. The baseband processor 1023 may read information (e.g., instructions and/or data) from and/or write information to the baseband memory 1009. Additionally or alternatively, the baseband processor 1023 may use instructions and/or data stored in the baseband memory 1009 to perform communication operations.

The baseband processor 1023 may be coupled to a radio frequency (RF) transceiver 1025. The RF transceiver 1025 may be coupled to a power amplifier 1027 and one or more antennas 1029. The RF transceiver 1025 may transmit and/or receive radio frequency signals. For example, the RF transceiver 1025 may transmit an RF signal using a power amplifier 1027 and at least one antenna 1029. The RF transceiver 1025 may also receive RF signals using the one or more antennas 1029.

Figure 11:
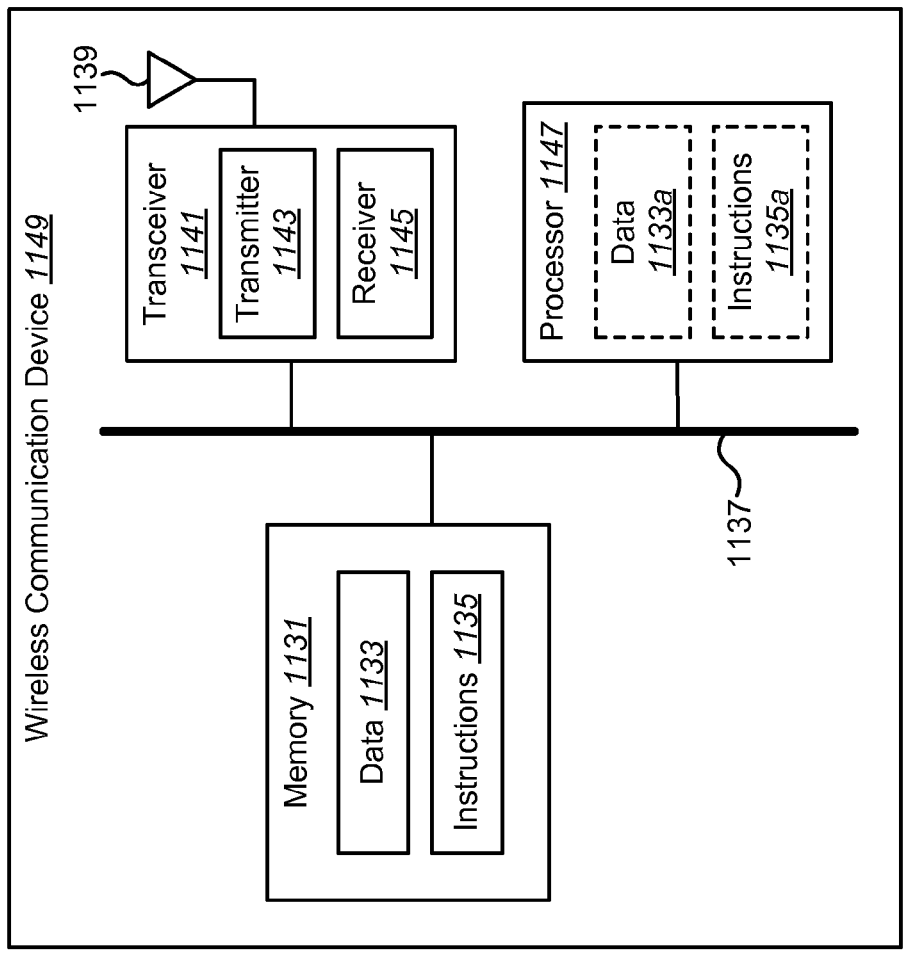
FIG. 11 illustrates certain components that may be included within a wireless communication device.

FIG. 11 illustrates certain components that may be included within a wireless communication device 1149. The wireless communication device 1149 described in connection with FIG. 11 may be an example of and/or may be implemented in accordance with one or more of the transmitting communication device 102, the receiving communication device 118 and the wireless communication device 1049 described in connection with one or more of FIGS. 1-4 and 7-10.

The wireless communication device 1149 includes a processor 1147. The processor 1147 may be a general purpose single- or multi-chip microprocessor (e.g., an ARM), a special purpose microprocessor (e.g., a digital signal processor (DSP)), a microcontroller, a programmable gate array, etc. The processor 1147 may be referred to as a central processing unit (CPU). Although just a single processor 1147 is shown in the wireless communication device 1149 of FIG. 11, in an alternative configuration, a combination of processors (e.g., an ARM and DSP) could be used.

The wireless communication device 1149 also includes memory 1131 in electronic communication with the processor 1147 (i.e., the processor 1147 can read information from and/or write information to the memory 1131). The memory 1131 may be any electronic component capable of storing electronic information. The memory 1131 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1133 and instructions 1135 may be stored in the memory 1131. The instructions 1135 may include one or more programs, routines, sub-routines, functions, procedures, code, etc. The instructions 1135 may include a single computer-readable statement or many computer-readable statements. The instructions 1135 may be executable by the processor 1147 to implement one or more of the methods 200, 300, 800, 900 described above and/or one or more of the functions described in connection with FIGS. 1-10. Executing the instructions 1135 may involve the use of the data 1133 that is stored in the memory 1131. FIG. 11 shows some instructions 1135a and data 1133a being loaded into the processor 1147.

The wireless communication device 1149 may also include a transmitter 1143 and a receiver 1145 to allow transmission and reception of signals between the wireless communication device 1149 and a remote location (e.g., a base station). The transmitter 1143 and receiver 1145 may be collectively referred to as a transceiver 1141. An antenna 1139 may be electrically coupled to the transceiver 1141. The wireless communication device 1149 may also include (not shown) multiple transmitters, multiple receivers, multiple transceivers and/or multiple antennas.

The various components of the wireless communication device 1149 may be coupled together by one or more buses, which may include a power bus, a control signal bus, a status signal bus, a data bus, etc. For simplicity, the various buses are illustrated in FIG. 11 as a bus system 1137.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

It should be noted that one or more of the features, functions, procedures, components, elements, structures, etc., described in connection with any one of the configurations described herein may be combined with one or more of the functions, procedures, components, elements, structures, etc., described in connection with any of the other configurations described herein, where compatible. In other words, any compatible combination of the functions, procedures, components, elements, etc., described herein may be implemented in accordance with the systems and methods disclosed herein.

The functions described herein may be stored as one or more instructions on a processor-readable or computer-readable medium. The term "computer-readable medium" refers to any available medium that can be accessed by a computer or processor. By way of example, and not limitation, such a medium may comprise Random-Access Memory (RAM), Read-Only Memory (ROM), Electrically Erasable Programmable Read-Only Memory (EEPROM), flash memory, Compact Disc Read-Only Memory (CD-ROM) or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-Ray® disc, where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server or other remote source using a coaxial cable, fiber optic cable, twisted pair, digital subscriber line (DSL) or wireless technologies such as infrared, radio and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for improving communication sensitivity performed by a wireless communication device, comprising:
   obtaining a string of bits;
   determining rate information based on channel quality information;
   mapping each bit in the string of bits to a pre-allocated bit pattern based on the rate information to create a series of concatenated pre-allocated bit patterns;
   generating a modulated signal based on the series; and
   transmitting the modulated signal.

2. The method of claim 1, wherein each pre-allocated bit pattern comprises one or more repetitions of a master pattern.

3. The method of claim 2, wherein the master pattern produces a circularly closed phase pattern.

4. The method of claim 2, wherein the master pattern comprises $\{-1, 1, 1, 1, -1, -1, -1, 1\}$ for a first bit value.

5. The method of claim 2, wherein the master pattern comprises $\{1, 1, 1, 1, -1, -1, -1, -1\}$ for a second bit value.

6. The method of claim 1, wherein a Euclidian distance between a first resulting phase pattern and a second resulting phase pattern is maximized.

7. The method of claim 1, wherein generating the modulated signal is based on constant-envelope modulation.

8. An apparatus for improving communication sensitivity, comprising:
   an application processor configured to determine rate information based on channel quality information;
   a pattern mapper configured to map each bit in a string of bits to a pre-allocated bit pattern based on the rate information to create a series of concatenated pre-allocated bit patterns;
   a modulator configured to generate a modulated signal based on the series; and
   a transmitter configured to transmit the modulated signal.

9. The apparatus of claim 8, wherein each pre-allocated bit pattern comprises one or more repetitions of a master pattern.

10. The apparatus of claim 9, wherein the master pattern produces a circularly closed phase pattern.

11. The apparatus of claim 9, wherein the master pattern comprises $\{-1, 1, 1, 1, -1, -1, -1, 1\}$ for a first bit value.

12. The apparatus of claim 9, wherein the master pattern comprises $\{1, 1, 1, 1, -1, -1, -1, -1\}$ for a second bit value.

13. The apparatus of claim 8, wherein a Euclidian distance between a first resulting phase pattern and a second resulting phase pattern is maximized.

14. The apparatus of claim 8, wherein generating the modulated signal is based on constant-envelope modulation.

15. An apparatus for improving communication sensitivity, comprising:
   means for determining rate information based on channel quality information;
   means for mapping each bit in a string of bits to a pre-allocated bit pattern based on the rate information to create a string of concatenated pre-allocated bit patterns;
   means for generating a modulated signal based on the series; and
   means for transmitting the modulated signal.

16. The apparatus of claim 15, wherein each pre-allocated bit pattern comprises one or more repetitions of a master pattern.

17. The apparatus of claim 16, wherein the master pattern produces a circularly closed phase pattern.

18. The apparatus of claim 16, wherein the master pattern comprises $\{-1, 1, 1, 1, -1, -1, -1, 1\}$ for a first bit value.

19. The apparatus of claim 16, wherein the master pattern comprises $\{1, 1, 1, 1, -1, -1, -1, -1\}$ for a second bit value.

20. The apparatus of claim 15, wherein a Euclidian distance between a first resulting phase pattern and a second resulting phase pattern is maximized.

21. The apparatus of claim 15, wherein generating the modulated signal is based on constant-envelope modulation.

22. A non-transitory tangible computer-readable medium having instructions thereon, the instructions comprising:
  code for causing a wireless communication device to obtain a string of bits;
  code for causing the wireless communication device to determine rate information based on channel quality information;
  code for causing the wireless communication device to map each bit in the string of bits to a pre-allocated bit pattern based on the rate information to create a series of concatenated pre-allocated bit patterns;
  code for causing the wireless communication device to generate a modulated signal based on the series; and
  code for causing a wireless communication device to transmit the modulated signal.

23. The non-transitory tangible computer-readable medium of claim 22, wherein each pre-allocated bit pattern comprises one or more repetitions of a master pattern.

24. The non-transitory tangible computer-readable medium of claim 23, wherein the master pattern produces a circularly closed phase pattern.

25. The non-transitory tangible computer-readable medium of claim 23, wherein the master pattern comprises $\{-1, 1, 1, 1, -1, -1, -1, 1\}$ for a first bit value.

26. The non-transitory tangible computer-readable medium of claim 23, wherein the master pattern comprises $\{1, 1, 1, 1, -1, -1, -1, -1\}$ for a second bit value.

27. The non-transitory tangible computer-readable medium of claim 22, wherein a Euclidian distance between a first resulting phase pattern and a second resulting phase pattern is maximized.

28. The non-transitory tangible computer-readable medium of claim 22, wherein generating the modulated signal is based on constant-envelope modulation.

* * * * *